United States Patent [19]

Hennel et al.

[11] 3,892,535

[45] July 1, 1975

[54] AMMONIA SYNTHESIS CONVERTER

[75] Inventors: Waclaw Hennel, Pulawy; Jan Cyrus-Sobolewski, Tarnow; Zbigniew Bartosik, Lublin, all of Poland

[73] Assignee: Instytut Nawozow Sytucznych, Pulawy, Poland

[22] Filed: May 8, 1973

[21] Appl. No.: 358,287

[30] Foreign Application Priority Data

May 10, 1972 Poland.................................. 155277

[52] U.S. Cl. .................. 23/288 K; 23/289; 165/158
[51] Int. Cl................................................ B01j 9/04
[58] Field of Search .. 23/289, 288 R, 288 K, 288 L, 23/288 M; 423/359–363; 165/158

[56] References Cited
UNITED STATES PATENTS 3,721,532  3/1973  Wright et al..................... 165/158 X

FOREIGN PATENTS OR APPLICATIONS 1,442,941  3/1969  Germany.............................. 23/289

Primary Examiner—James H. Tayman, Jr.
Assistant Examiner—Roger F. Phillips
Attorney, Agent, or Firm—Eric P. Schellin

[57] ABSTRACT

The improved generally-inverted T-shape converter for ammonia synthesis comprises a horizontal high-pressure vessel on which is positioned a vertical high-pressure vessel with free fluid commnication therebetween. Inside these vessels is placed a low-pressure vessel forming one unit also of inverted T-shape geometry similar to that of the high-pressure assembly. The horizontal part of the reactor contains at least two axially-aligned reaction chambers, within each of which is a catalyst supported on grates forming catalyst beds, and the vertical part contains a heat exchager of which one side is in fluid flow communication with a first one of the reaction chambers, which chambers have serial fluid flow communication, and a second side of the heat exchanger is in fluid flow communication with the second one of said reaction chambers. The space under the catalyst bed of the second reaction chamber is fluidly connected with the second side of the heat exchanger by means of a combined heat-exchanger support and vertical duct resting on the inner surface of the horizontal low-pressure vessel directly, or by means of another support therefor.

6 Claims, 2 Drawing Figures

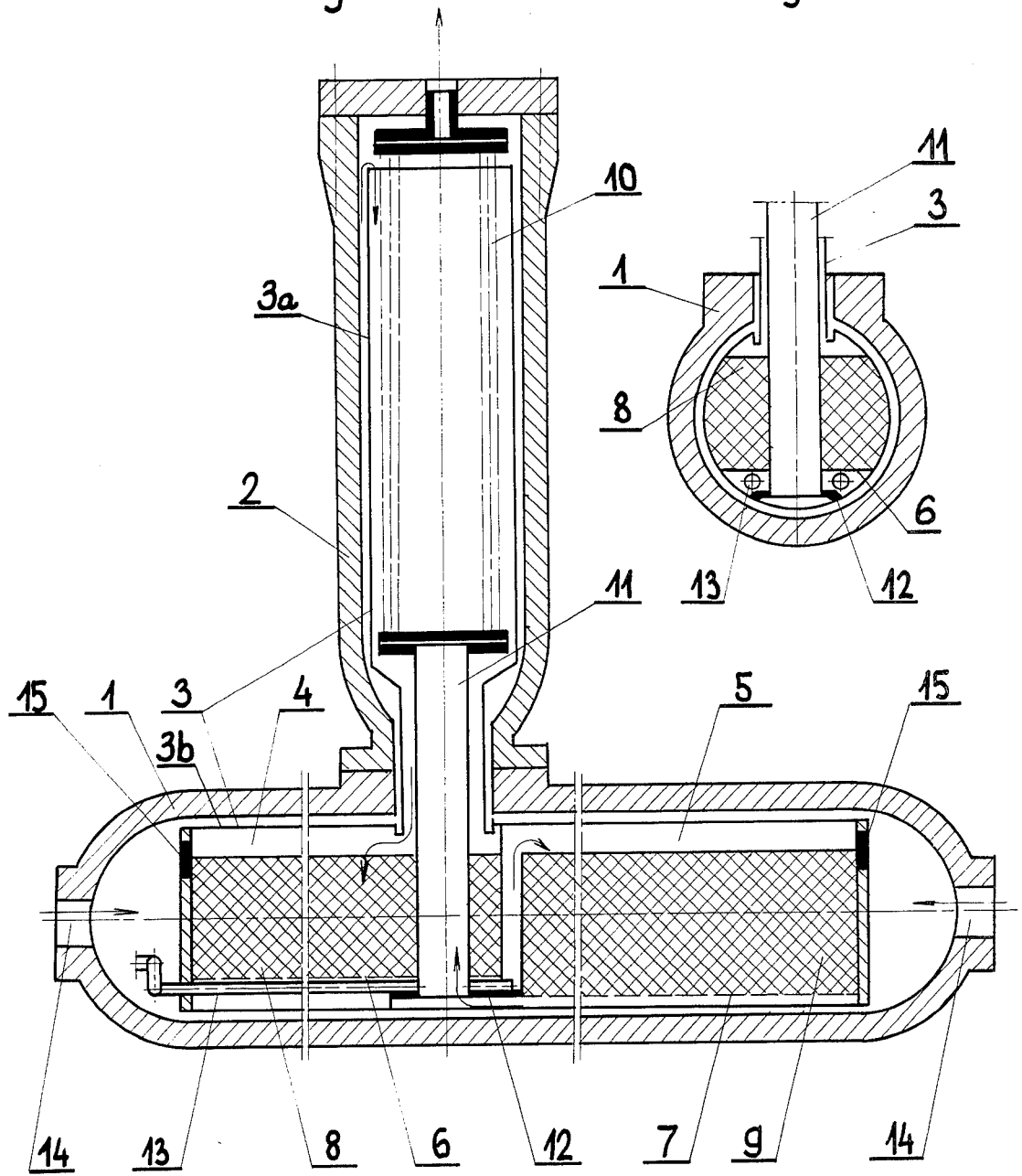

AMMONIA SYNTHESIS CONVERTER

This inventions relates to the ammonia synthesis converter containing a heat exchanger and reaction chambers with catalyst beds.

Many designs are known of the ammonia synthesis converters, differing in the vertical or horizontal position of the whole converter as well as in the arrangement of their internal parts. These internal parts are generally enclosed in a low-pressure shell and the whole assembly is placed in the high-pressure converter shell. This assembly is referred to later in this description as the converter inner parts.

Among the known types of converters, the horizontal converters are preferred at present due to the trend to build large ammonia synthesis units.

The vertical converters for such great units must be either very high and in this case costly cranes are needed for lifting the converter shell as well as for lifting the catalyst basket and heat exchanger when changing catalyst or they must have great diameters which involves large fabrication and transport problems. On the other hand, the horizontal positioning of part of the converter makes it possible to place the catalyst material in beds offering great cross sectional areas for the flow of therethrough of the reaction gas. The pressure drop across such beds is small which enables the application of a small catalyst granulation which increases greatly catalyst efficiency.

The horizontal converter of the known type consists of a horizontal high-pressure shell and a low-pressure shell containing a heat exchanger at its one end, and in the remaining part of the shell, within compartments situated one after another along the converter axis and separated from each other by vertical partitions are catalyst beds on grids. The incoming synthesis gas flows through the heat exchanger, is heated by the hot reaction gases and then flows through the pipeline to the reaction chamber lying at the opposite end of the converter inner parts assembly. In the chamber gas flows downwards through the catalyst bed and after passing the grid is directed to the top of the next chamber, and so on. In the typical prior art design of the converter the gas passing from one chamber to another receives an additional quantity of cold gas fed by means of a special pipeline by-passing the heat exchanger to lower the temperature of the reaction gases. After leaving the last, e.g., the third chamber, the gas flows through the heat exchanger and leaves the converter.

The above prior art design of the ammonia synthesis converter regarded as the best of the known ones has beside the above mentioned advantages two major faults. In case of changing catalyst it is necessary to withdraw the inner parts from the converter shell even when there are two chambers only, because only one reaction chamber situated at the converter end opposite the heat exchanger is accessible through the manhole from the front. The weight of the converter inner parts together with the catalyst load of many tons makes this operation very difficult, and devices provided for easy manipulation, as for example carriages at both ends can be used only if the converter is not too long.

The necessity to conduct gas inside the said prior art type converter through a duct running parallel to the converter axis from the heat exchanger to the most distant reaction chambers is another disadvantage. This duct runs through vertical partitions between the chambers. These passages must be made tight. As the thermal expansion of the duct differs from that of the chambers during various periods of the process, detrimental stresses are produced in the inner parts which may cause damage.

The object of the present invention is to eliminate the inadequacies of the above named prior art, horizontal type converter. This object was achieved by the unique arrangement using a horizontal position of only that part of the converter, which contains the reaction chambers, and by the vertical position of that converter part which contains the heat exchanger.

The converter according to this invention is formed by two cylindrical shell components, one being horizontal and the other vertical. The whole assembly is in the shape of the inverted T by integrally intersecting the smaller vertical shell with the larger horizontal one, and not necessarily in the middle of the latter. This high-pressure assembly produced by the interconnection of the two cylindrical shells contains inner parts formed by the similar interconnection of two low-pressure, cylindrical shells. The low-pressure assembly is of geometry similar to that of the high-pressure shells. Its dimensions and spatial mounting, however, provide an ample annular gap between the low and high-pressure shells.

The total height of the converter according to the present invention, which height is determined by the diameter of the horizontal shell, and the height of the vertical shell is relatively small, and no high lifting cranes are needed for construction and dismantling.

In the converter according to the present invention there is freedom to expand in the three axial directions from a fixed point which is situated near the intersection of the two shells and there is also freedom for radial expansion.

The converter according to the invention has two reaction chambers each of which is directly connected to the heat exchanger and there is no longitudinal conduit which would cause stresses in the converter parts. Both reaction chambers are accessible through the manholes situated at both ends of the horizontal shell which enables easy catalyst changing. This operation is carried out without extracting inner parts from the high pressure shells as well as without dismantling any full diameter cover.

An alternative design of the converter according to this invention which has three or four reaction chambers, is not so advantageous as that described above with two chambers, but it is still better than the multiple kind of the prior art horizontal converter. The longitudinal duct inside the converter of this alternative embodiment is not entirely eliminated but the temperature difference between this duct and the inner parts is reduced, which reduces the danger of detrimental stresses. The temperature difference reduction results from the division of the chambers in two groups at both sides of the heat exchanger.

The more preferred embodiment of this invention is a converter with two reaction chambers shown in FIG. 1, which shows the converter in cross section along its horizontal and vertical axis.

FIG. 2 shows one detail of the converter i.e., the cross section of the vessel 1 along the axis of the vertical vessel 2.

The converter according to the present invention comprises two cylindrical, high-pressure vessel components which are connected with each other, one horizontal 1 and one vertical 2. Inside these vessels there is the low-pressure vessel 3 forming one unit consisting of two low-pressure parts, one vertical 3A and one horizontal which are connected with each other similar to vessel components 1 and 2, but spaced inwardly thereof. The horizontal vessel component 1 contains the reaction chambers 4 and 5. In each of said chambers there is the catalyst provided on grids 6 and 7 forming catalyst beds 8 and 9.

The vertical vessel component contains the heat exchanger 10 which is placed on a vertical hollow support pipe 11. The lower end of the pipe 11 rests on the inside surface of the body of the low-pressure vessel 3 by means of a support 12. Underneath the grid 6 there is a duct 13 for introduction of cold feed gas. There are access openings or manholes 14 at both ends of the shell 1 which correspond to access openings or manholes 15 of the inner low pressure body 3.

The direction of gas flow is shown by various arrows in FIG. 1. Gas entering at both ends of the shell 1 flows between the walls of the vessels 1 and 2 and the walls of the vessel 3. From this space forming an annular gap between the high pressure vessels 1, 2 and low pressure vessel 3, the gas flows to a first side of the heat exchanger which is the space between the tubes of the heat exchanger 10 and when then heated there, it enters the chamber 4 and flows through the catalyst bed 8. After passing the grid 6, gas flows upwards to the chambers 5 on top of the bed 9 resting on the grid 7 and is mixed with cold gas which is introduced by the conduit 13 for cooling the gas after reaction in the first part or chamber. After passing downwards through bed 9 and grid 7, the gas flows beneath grid 7, up the hollow support pipe 11, to the second side of the heat exchanger, intermingling through the tubes of the heat exchanger 10 and then leaves the converter.

Both reaction chambers 4 and 5 with catalyst beds are easily accesible from both converter ends which enables the catalyst exchange without any dismantling, except opening the respective manhole covers 14 and 15.

As illustrated in FIG. 1 and 2 there is a complete freedom for expansion in all three axial directions of the body 3 from the fixed point, the latter of which is determined by the lower end of the pipe 11, provided with the support 12. The inner part of both chambers are of a very simple design which ensures their long service life in spite of the fact, that they are the hottest part of the converter. It is to be noted, that in the chamber 4 or 5 there is a possibility to fix more than one grid for the catalyst bed.

What we claim is:

1. In an ammonia synthesizing converter apparatus embodying fluid inlet and outlet passages, and a heat exchanger (10) in communication with at least a pair of low-pressure reaction chambers (4,5) having catalyst beds (6,7), the improvement wherein said converter apparatus is of unitary inverted generally T-shape comprising unitarily-interjoined horizontal (1) and vertical (2) high-pressure outer vessel components including wall means forming respectively intercommunicating horizontal and vertical outer chambers; said horizontal outer vessel component having fluid inlet passages near longitudinally opposite end portions for fluid flow communication of a feed gas into said outer chambers; said vertical outer vessel component having a fluid outlet passage at a top end portion thereof; said horizontal outer vessel component having disposed therein, in radially spaced relation, separate wall means defining a horizontal inner low-pressure vessel (3b) including means forming at least first and second low-pressure reaction chambers (4,5) in longitudinal disposition for housing said catalyst beds; said high-pressure outer vertical vessel component (2) having therein separate wall means spaced radially inward thereof and defining a vertical inner low-pressure chamber (3a) for housing upright heat-exchanger means (10) therein; said first and second chambers being generally on opposite sides of said vertical outer and inner chambers; said heat exchanger means having first and second sides; means serially connecting one end portion of said first reaction chamber (4) with an adjacent end portion of the second reaction chamber (5) for fluid flow communication therebetween; said vertical inner chamber (3a) having open upper and lower portions, said open upper portion being in direct communication via said radial spatial disposition with said outer vertical chamber (2) and with said horizontal chamber (1); said open lower portion connected unitarily to and for fluid communication with said first reaction chamber (4); said first side of said heat-exchanger means being in open communication at the upper end with said vertical horizontal outer chambers and at the lower end with said first reaction chamber (4), and said second side of said heat exchanger means being in open communication at the upper end with said fluid outlet passage in the vertical outer high-pressure vessel component, and at the lower end with said second reaction chamber (5); means connecting said fluid outlet passage for fluid flow communication with said second side of said heat-exchanger means; said reaction chambers (4,5) and inner vertical chamber (3a) collectively also being of inverted generally T-shape; said heat-exchanger means disposed uprightly within said inner vertical chamber (3a), and combined fluid conduit and support means supporting said heat-exchanger means in spaced generally coaxial relation therewith so as to permit engagement-free lateral and vertical movement to accommodate any dimensional changes occasioned by thermo-expansion of said apparatus; and said inner and outer pressure chambers, said catalyst beds, and said heat-exchanger means collectively disposed so as to provide fluid gas-flow entering opposite ends of said horizontal outer vessel component in communication with said heat-exchanger means so as to flow past said first side of said heat exchanger means into said first reaction chamber (4), passing therethrough and serially into said second reaction chamber (5), and thence serially past said second side of said heat-exchanger means and out of said outlet passage of said outer vertical high-pressure vessel component.

2. Improved ammonia synthesizing apparatus as defined in claim 1, wherein said reaction chambers respectively include grid means for supporting catalyst material in each chamber; closure means with selectively openable service access openings therein, for closing axially remote ends of the axially disposed reaction chambers (4,5); and said means for providing fluid flow intercommunication between said axially aligned reaction chambers (4,5) including means defining a vertically oriented fluid passageway interposed between adjacent ends of said longitudinally disposed catalyst beds (8,9); said combined fluid conduit and support means constituted by a vertical fluid flow duct (11) transversely connecting said second one of said reaction chambers directly with said second side of said heat-exchanger means, thus permitting at least partially synthesized gas to pass from said reaction chambers to said heat exchanger and to flow from said converter by the outlet in said outer vertical chamber of said outer high-pressure vessel.

3. Improved ammonia synthesizing apparatus as defined in claim 2, wherein said vertical fluid-flow duct (11) has a lower portion passing through said first of said reaction chambers and a lower-most end operatively supported by a portion of said wall means defining a part of said low-pressure reaction chambers.

4. Improved ammonia synthesizing apparatus as defined in claim 2, further including combined servicing access means with said fluid-flow passages in opposite ends of said horizontal high-pressure vessel.

5. Improved ammonia synthesizing apparatus as defined in claim 1, further including a separate duct (13) for introducing cold or cooling feed gas directly into said an axially disposed second of said pair of inner low-pressure vessel reaction chambers for cooling the effluent or synthesizing gas fluid after reaction thereof in said first of said two reaction chambers.

6. In a converter apparatus for synthesizing ammonia, which apparatus embodies a heat exchanger and reaction chambers, the improvement wherein said converter apparatus is of uniquely compact, simplified unitary inverted generally T-shape comprising concentrically-spaced high-pressure outer and low-pressure inner vessels, respectively, and between which vessels cold feed gas is conducted via feed gas inlets near opposite end portions of a horizontal portion of said outer high-pressure vessel to cool the outer high-pressure vessel, each of said vessels having integrally interjoined wall means in spaced-apart relation; said inner wall means forming a stem part of the inverted T-shape to constitute a heat exchange chamber for disposition therein of vertical heat-exchanger means having first and second sides, said gas passing through said first side of said heat-exchanger means; said heat-exchange chamber generally medially intersects by its interposition generally between and operatively communicates with at least a pair of generally axially-aligned horizontally-disposed first and second reaction chambers having serial fluid flow communication, said reaction chambers respectively containing catalyst-bed means disposed between a pair of feed gas inlets provided at axially opposite ends of said horizontal portion of said outer high-pressure vessel; and fluid passage means connecting generally axially adjacent portions of said reaction chambers for said serial fluidflow communication with each other, and separate fluid passage and heat-exchanger means support means connecting the second of said reaction chambers with said heat-exchanger means whereby said feed gas passes a second side of heat-exchanger means enroute out of said converter apparatus via an outlet in an upper portion of said outer high-pressure vessel; and whereby said inner and outer vessels are relatively mounted so as to preclude uncontrolled movement with respect to one another and to thereby accommodate engagement-free dimensional change movement attendant passage of a feed-gas fluid stream in heat-exchange relationship with an at least partially-synthesized gas flow passing from said reaction chambers.

* * * * *